3,850,864
COMPOUND TO MAKE PRODUCTS, PER SE AND
TO CAST OTHER MATERIALS
David U. Emerson, 12615 NE. 30th St.,
Bellevue, Wash. 98005
No Drawing. Continuation-in-part of abandoned application Ser. No. 145,536, May 20, 1971. This application Dec. 6, 1972, Ser. No. 312,775
Int. Cl. C08g 51/18
U.S. Cl. 260—17.2
13 Claims

ABSTRACT OF THE DISCLOSURE

A compound derived by mixing a composition of materials comprising an active metal alginate, such as sodium or potassium alginate, sodium calcium alginate, and ammonium and calcium alginates, phenolic microspheres of a diameter range of 0.002 to 0.005, with average being about 0.0017 of an inch, which are filled with an inert gas, primarily nitrogen, and water, is pliable in varying degrees depending primarily on its water content; ultimately becoming hard as an end product upon the substantial withdrawal of water, yet at all times being returnable for another use, except for removal of contaminated portions, to its pliable status upon the reintroduction of water. The toughness of selected resulting compounds is further controlled with respect to selected water proportions by also adjusting the overall proportions of the active metal alginate and the phenolic microspheres. For example, as the active metal alginate is increased and the phenolic microspheres are decreased, the compound becomes tougher.

The resulting compound is used in dentistry, industry, art schools and studios, and in the home. It is used for forming spaces to receive casting materials, to form objects or products, per se, to fill spaces and cracks, to be used as a heat resisting shield material, for example, during soldering or welding, to be used as an insulator whether hot or cold and whether it is used wet or dry, and for use by children during their playtime serving the function, for example, of molding clay. For storage and shipment times, the compound may remain as a dry mix, free of water, until time of use. Also as may be necessary, germicides and/or preservatives are added. At all times during its use, the composition of materials is considered as being a clean and convenient compound to work with, especially in comparison to wax, clay and/or sand, because of both its coherence and ultimately its water solubility.

CROSS REFERENCE

This is a continuation-in-part application based on the copending application Ser. No. 145,536 filed May 20, 1971 by David U. Emerson and entitled, "Molding Material and Moldable Product Material" and priority is so claimed. This application is now abandoned.

BACKGROUND OF THE INVENTION

Whenever objects are to be created by pouring a substance into a mold, there has always been a need for having a material or materials which could be formed to thereafter receive the poured substance. Foundry sand and binders have been used extensively in heavy industry. Wax has been used extensively in dentistry. However, there has always remained a need for a material to be readily formed more quickly and conveniently to receive, for example, the plaster used in dentistry during the making of false teeth. In searching for such a material or compound to be used in dental laboratories, this pliable composition of materials in its various compounds of different proportions was created by mixing active metal alginates such as sodium or potassium alginate, sodium calcium alginate, and ammonium and calcium alginates, phenolic microspheres of a range of 0.002 to .005, with average being about 0.0017 inch diameter, and water, often delayed until the time of use, in respective proportions. Subsequently, more uses were found beyond the needs of dentistry, such as in commercial and art models, for crack fillers, for exercising compounds, and for children's use during their playtimes.

SUMMARY OF THE INVENTION

A pliable material to be initially formed to receive and in turn to control forming of other materials, or to be formed itself to become an end product is created by mixing an active metal alginate such as a sodium or potassium alginate, sodium calcium alginate, and ammonium and calcium alginates, microspheres of phenolic resin of a diameter range of 0.002 to .005, with average being about 0.0017 inch, and water. If necessary, to increase its resistance to bacterial action, a selected preservative is added. If necessary, to avoid germs, a germicide is added which often also serves as a preservative.

The practical and economical range of selected proportions of the mixed substances varies from a tough compound, in reference to a total weight of 500 grams, consisting of 100 grams of an active metal alginate, 50 grams of phenolic microspheres, and 350 grams of water, to a softer compound, in reference to a total weight of 500 grams, consisting of 25 grams of an active metal alginate, 125 grams of phenolic microspheres, and 350 grams of water. Within this range, there are resulting compounds especially useful in holding dental impressions during the pouring and hardening of a cast. One of these compounds dental work, in reference to a total weight of 500 grams, has proportions of 75 grams of an active metal alginate such as sodium or potassium alginate, 75 grams of phenolic microspheres, and 350 grams of water. Another one of these compounds for dental work in reference to a total weight of 500 grams, has proportions of 60 grams of potassium alginate, 90 grams of phenolic microspheres, and 350 grams of water.

In addition to its outstanding utilization in dental laboratories for boxing in a dental impression and other dental uses, such as swaging, this pliable composition of materials is used in industry during molding operations, during construction and refinishing as a crack filler, and for mock up projects. It is used in art training and production for modeling, often replacing clay and avoiding the messy side effects of working with clay. It is used as a compound to be squeezed during hand exercises undertaken generally during the recovery period after an injury. Also, it is used as a compound for children to play with in making things.

During all these uses, while it remains moist it remains pliable, and the addition or withdrawal of its moisture regulates its pliability, and the adjustment of proportions between the active metal alginate, such as sodium or potassium alginate, and the phenolic microspheres regulates its toughness. Firmness is acquired upon the extensive withdrawal of moisture. Baking of a formed object derived from the compound may be undertaken. After baking or some other thorough drying procedure, the formed object may thereafter be painted or otherwise coated to create an ornament or another art object.

Yet substantial reclamation is possible by reintroducing moisture regardless of how long the compound has remained in the dry state. The only losses occur because of contamination, generally occurring at the intermixed boundary portions which are readily separated and generally discarded. At all times the final clean up is undertaken rapidly and conveniently with the use of water.

DESCRIPTION OF PREFERRED EMBODIMENTS

Dentistry Embodiments

The need for a better molding material in dentistry resulted in the creation of this compound derived by mixing an active metal alginate such as potassium or sodium alginate, phenolic microspheres, and water. Two mixtures have specifically worked very well. One consists of 75 grams of potassium alginate, 75 grams of microspheres, and 350 grams of water; the second consists of 60 grams of potassium alginate, 90 grams of microspheres, and 350 grams of water. The first is slightly tougher than the second. Both are considered as extremely clean materials which will not contaminate anything coming into contact with them. They will wash off easily with water supplemented on occasions with a brush. These proportional mixtures, when not intermixed with other materials, are reusable.

When necessary, germicides are added and they also serve as preservatives, or preservatives per se, are added. A selected germicide is a diluted 12.9% solution of N-alkyl, dimethyl benzyl ammonium chloride (Bensalkonium Chloride), added to the diluent in an amount to equal or approximate one percent of the total water content of this molding material. Also diluted "Chemprocide" germicide solution (N-alkyl, dimethyl benzyl ammonium chloride, 10% by wt.; trisodium phosphate, 1% by wt.; and tetrasodium ethylene diamine tetra acetate, 1% by wt.) is used.

Generally, when a germicide is not used and there is to be a prolonged usage of this molding material, a preservative is added to equal or approximate one percent of the total water content of the molding material. The selected preservatives, generally in a 1 to 3% solution by weight, are: formalin; methyl parasept or propyl parasept from Tenneco Chemicals, Inc.; Dowicide A, which is the sodium salt of o-phenylphenol or Dowicide G, which is the sodium salt of pentachlorophenol from Dow Chemical Company; Santosite from Monsanto Chemical Company, which is 98% anhydrous sodium sulfite and 2% sodium sulfate; Vancide 51 from R. T. Vanderbilt Company, which has 27.6% sodium dimethyldithiocarbamate and 2.4% sodium 2-mercaptobenzothiazole; sorbic acid; potassium sorbate; and combinations of methyl and propyl parasepts.

The phenolic resin microspheres also described as phenolic resin microscopic hollow spheres have an average diameter of .0017 of an inch. It is understood that they were originally developed by persons serving the Bakelite Company in cooperation with persons serving the Standard Oil Company of Ohio, to find an effective way to reduce oil evaporation. When these phenolic microspheres are mixed with conventional polyester resins, a low density high strength material called syntactic foam is derived which has been used as sandwich core material in reinforced plastic boats. These phenolic microspheres resemble fine red flour and are made of "Bakelite" thermosetting phenolic resin. In a batch the overall size range is .0002 to .005 inch. After a concentrated sodium hydroxide treatment and a physical examination, wherein the infrared absorption spectra peaks were observed at 2.95, 6.4 and 8.2 microns, the microspheres always have the characteristic of a phenol. The microballons generally are a phenol polymer having a formula

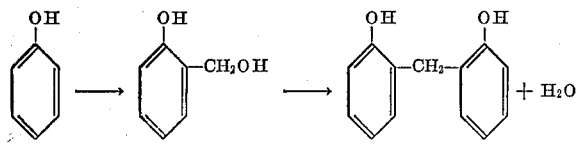

The condensing co-reactant is formaldehyde.

They are prsently available under the trademark "Microballon." The "Bakelite" phenolic microspheres have an average particle size in diameter of 0.0017 inch in a size range of .0002 to .005 inch. The bulk density is 3 to 5 pounds per cubic foot, and the actual sphere density is 12 pounds per cubic foot.

For use in dentistry, however, these phenolic resin microspheres are mixed with an active metal alginate such as sodium or potassium alginate and water to create various pliable and tough adherent compounds for continuing reuse as molding and holding materials. For example, either of the specific compounds previously set forth and in various proportions using active metal alginates which are quite similar, are used before and during the pouring of a dental cast.

A plastic holding ring .2 inch thick, generally four inches in inside diameter, and two inches high, is filled with the compound. Subsequently, a dental impression is embedded in the compound to a desired depth. The excess material that is pushed out the bottom is scraped off flush with the bottom of the ring and returned to the supply container of the compound for another use. For example, some of it is immediately taken again and placed around the dental impression, leaving however, a clear space about the immediate periphery of the dental impression and then being tapered or sloped about the clear volume so no undercuts will develop.

The plaster cast is then poured and after it has set, the dental impression and the plaster cast are pushed out from the bottom of the plastic holding ring. Thereafter, the compound molding material, to a depth of about one-sixteenth of an inch of material which did or may have contacted the cast plaster is scraped away and discarded, leaving the rest of the compound to be used again. Final cleaning of the cast plaster or stone and the ring is readily undertaken by using water and, as necessary, a brush and on some occasions soap.

Industrial Embodiments

This compound, resulting from the selected quantities of an active metal alginate such as sodium or potassium alginate, phenolic resin microscopic hollow spheres, and water is useful in industry. It is available preferably in the economical and practical range, commencing with the weight ratio for a tougher compound of 2 parts of an active metal alginate such as potassium alginate to 1 part of phenolic microspheres with 7 parts of water, and extending to a weight ratio for a lower strength compound of 1 part of an active metal alginate such as potassium alginate to 5 parts of phenolic microspheres with 14 parts of water. The resulting mixture compounds derived from this suggested range, are used to form parts employed in mock ups; employed in lieu of sand, etc. as the material packed around a pattern of a part to be cast; used to temporarily hold parts in place; thoroughly dried and then surface coated to become an end product; and used as a crack filler, for example in dry wall construction.

Art Embodiments

This compound derived by mixing an active metal alginate such as a sodium or a potassium alginate, phenolic resign microspheres, and water within the economical and practical range set forth under industrial embodiments serves many uses in the study and rendering of art. It may effectively be used in lieu of clay during molding operations, and like molded clay, may be baked and finished to form an end art object, for examples, such as a bust of a particular person, a pin cushion, or a bowl. At all times, it is considered as a comparatively clean product, easily derived, modified, used, stored, reclaimed and cleaned up. During final cleaning, flushing water and the occasional use of a brush is all that is required. Except for surface contamination requiring some scraping away, the balance of the compound is recovered to be reused again.

Toy and Exercise Embodiments

This compound derived by mixing within the economical and practical range set forth under industrial embodiments serves many purposes in the children's toy product area. It may be handled by children as they form it into play objects or as they form it to receive other objects. Also, for their exercise and/or for an adult's exercise, especially following a hand injury, this compound may be squeezed within one's hand during exercise periods.

Summary of Advantages

Throughout these known uses related respectively to dentistry, industry, art, toys and exercise units, the selected tougher or less tough compounds derived by mixing active metal alginates such as sodium and potassium alginate, phenolic microspheres, and water to acquire a pliable, cohesive, working compound, serve many purposes in a much more convenient and economical manner than any of those materials used previously, such as sand or wax. Moreover, new uses are set forth and more are sure to follow. Throughout all uses, the cleanliness realized during the handling of the compound and during the follow on cleaning period enhances the utilization of the compound. Whether the compound is to be used as a means to make products or it is to be used as an end product, it is always reclaimable by the addition of water and stored away for another use, subject only to the discarding of intermixed surface portions contaminated, for example, by poured plaster during dental operations.

It should also be realized that the preliminary compound may be stored as a dry mix and also so shipped, and the water not added until time of use. Uses will continue to be found for this compound, and the list grows daily. For example, recently a plumber has used the compound to protect an adjacent wall before soldering. Also in a dental laboratory it is now being used to surround metal parts being held while soldering and welding is undertaken. This is very true and especially needed when the nearby metal has a plastic covering which must be protected. Also the wet or dry compound is being used as a hot or cold insulator in containers or like structures to keep constant or near constant the interior temperature of the container and its contents.

In regard to the alginates, within the scope of the compound objectives, other alginates will be found useful. At the present time, sodium alginate, potassium alginate, ammonium and calcium alginate, sodium calcium alginates are used.

Many of the starting materials are sold under various trademarks and brochures listed as follows are attached hereto for reference to the trade name products being utilized. Also please note the information set forth by BioMed Research Laboratories about the phenolic microspheres, sold for example under the trademarks of "Microballons," and "Eccosphere." It is understood these phenolic microspheres have an inert gas in their interiors, primarily nitrogen.

List of Following Attachments (1) Copy of brochure of Kelco Company, copyright 1961, entitled "Kelco Algin"—The Story of its Control Over the Water in Products we Use in Our Daily Lives, With Specific Reference to Page 6, regarding products identified as Kelcosol, Keltose, Kelmar, Improved Kelmar and Page 10, Keltex—all used by Applicant.

(2) Copy of brochure—Kelco Co. Technical Bulletin DB #12, page 3, re: potassium sorbate as a preservative—used by the Applicant.

(3) Copy of Reprint of Food Technology, Vol. 25, No. 5, pages 22–31, regarding Xanthan Gum—used by the Applicant.

(4) Copy of Litton Dental Products Label for Professional Germicidal Concentrate—12.9% Bensalkonium Chloride—used by Applicant.

(5) Copy of Label of Pacific Chemical re: Chemprocide product—used by Applicant.

(6) Copy of BioMed Research Laboratories letter of 12/5/72.

(7) Copy of Technical Release #4 Revised, the Bakelite Company.

I claim:

1. A composition of materials forming a compound used to form spaces to receive casting materials, and used to make products per se, comprising:
 (a) an alginate from a group consisting of an alkali metal and ammonium alginates;
 (b) phenolic resin microspheres of an average diameter of about 0.0017 inch; and
 (c) water
wherein the practical range of proportions by weight in preparing 500 grams, is from about 2:1:7 to 1:5:14 parts respectively of said alginate, phenolic resin microspheres, and water.

2. A composition of materials forming a compound for use in dentistry in boxing, modeling, compression molding, avoiding undercuts, and holding objects to be cemented, comprising proportionately by weight per 100 grams total:
 (a) 5 grams of an alginate from a group consisting of an alkali metal and ammonium alginates;
 (b) 25 grams phenolic resin microspheres of an average diameter of about 0.0017 inch, and
 (c) 70 grams of water.

3. A composition of materials forming a compound used to hold a dental impression in place while pouring a cast, comprising proportionately:
 (a) 75 grams of an alginate from a group consisting of an alkali metal and ammonium alginates;
 (b) 75 grams of phenolic resin microspheres of an average diameter of about 0.0017 inch; and
 (c) 350 grams of water.

4. A composition of materials forming a compound used to hold a dental impression in place while pouring a cast, comprising proportionately:
 (a) 60 grams of an alginate from a group consisting of an alkali metal and ammonium alginates;
 (b) 90 grams of phenolic resin microspheres of an average diameter of about .0017 inch; and
 (c) 350 grams of water.

5. A composition of materials forming a compound for compression molding and holding objects to be cemented, comprising proportionately:
 (a) 100 grams of an alginate from a group consisting of an alkali metal and ammonium alginates;
 (b) 50 grams of phenolic resin microspheres of an average diameter of about .0017 inch; and
 (c) 350 grams of water.

6. A composition of materials forming a compound to be used once for molding and then generally discarded after coming into contact with plaster throughout large surface areas, comprising proportionately:
 (a) 25 grams of an alginate from a group consisting of an alkali metal and ammonium alginates;
 (b) 125 grams of phenolic resin microspheres of an average diameter of about .001 inch; and
 (c) 350 grams of water.

7. A composition of materials forming a compound, as claimed in claim 1, comprising in addition a germicide.

8. A composition of materials forming a compound, as claimed in claim 7, wherein the germicide is selected from a group consisting of a diluted solution containing 12.9% N-alkyl, dimethyl benzyl ammonium chloride, and a diluted solution containing by weight 10% N-alkyl dimethyl benzyl ammonium chloride, 1% trisodium phosphate, and 1% tetrasodium ethylene diamine tetra-acetate.

9. A composition of materials forming a compound, as claimed in claim 8, wherein the germicide selected is added on the basis of 1% to 3% by weight of the water.

10. A composition of materials forming a compound, as claimed in claim 1, comprising in addition a preservative solution from the group consisting of: formalin; methyl parasept; propyl parasept; sodium salt of o-phenyl-phenol sodium salt of pentachloro-phenol; 98% anhydrous sodium sulfite and 2% sodium sulfate; 27.6% sodium dimethyl-dithiocarbamate and 2.4% sodium 2-mercaptobenzo-thiazole; sorbic acid; potassium sorbate; and combinations of methyl and propyl parasepts.

11. A composition of materials forming a compound, as claimed in claim 10, wherein the preservative is used in a quantity ranging from 1 to 3 percent based on the weight of solution.

12. A composition of materials forming a compound, as claimed in claim 1, wherein the alkali metal alignate is potassium alginate.

13. A composition of materials forming a compound, as claimed in claim 1, wherein the alkali metal alignate is sodium alginate.

References Cited

UNITED STATES PATENTS

| 2,101,635 | 12/1937 | Bender | 260—2.5 |
| 2,211,429 | 8/1940 | Muller | 260—2.5 |
| 3,061,572 | 10/1962 | Packer | 20—23 |
| 3,316,187 | 4/1967 | Grosner et al. | 260—2.5 |

MELVIN GOLDSTEIN, Primary Examiner

E. WOODBERRY, Assistant Examiner

U.S. Cl. X.R.

260—2.5B